United States Patent Office 2,754,200
Patented July 10, 1956

2,754,200
ALLOY WELD RODS

Arthur T. Cape, Los Angeles, Calif., assignor to Coast Metals, Inc., Little Ferry, N. J., a corporation of Delaware No Drawing. Application July 28, 1953,
Serial No. 370,880

5 Claims. (Cl. 75—123)

This invention relates, as indicated, to alloy weld rods.

A primary object of the invention is to provide a weld rod which is especially useful in arc and gas welding for forming welds which are extremely hard and tough and resistant to impact, particularly where abrasion due to fine materials is encountered.

A further object of the invention is to provide a weld rod of the character described capable of laying down hard facings or welds which have physical and metallurgical properties intermediate those provided by present hard facing alloy steel cast rods and tungsten carbide tube rods.

Other objects and advantages of the invention will become apparent during the course of the following description.

A weld rod manufactured in accordance with my invention will contain, as its principal or basic ingredients, iron, molybdenum, boron and carbon.

The ranges of the foregoing ingredients will be approximately as follows:

| | Percent |
|---|---|
| Molybdenum | 18–32 |
| Boron | 2.8–4 |
| Carbon | 1–3 |
| Iron | Balance |

Optional ingredients, which may be added in making the weld rod, may be copper, in amounts up to about 3.5%, chromium in amounts up to about 3%, and nickel in amounts up to about 3%.

A preferred composition will contain about 25% molybdenum, about 3.4% boron, about 1.75% carbon, about 2% copper, about 2% chromium, and the balance iron.

The weld rod may be made as a cast rod, but I prefer to make the rod in the form of a steel or iron tube filled with the ingredients, other than the iron, which constitute the weld rod.

Fluxes such as monazite and borax glass may be used in connection with the weld rods in relatively small amounts. In the case of solid rods, monazite may be used as a coating. In the case of tube rods, both monazite and borax glass may be used as filler ingredients, although monazite may be omitted.

As an example of a weld rod which has been found to have exceptional properties along the lines indicated, I utilize, in the manufacture of the rod, a tube, approximately 14 inches long, made of SAE 1015 steel, having an outside diameter of ¼" and a wall thickness of .020". This tube is then filled with the other ingredients constituting the weld rod, these ingredients being thoroughly and intimately mixed with each other before being inserted into the tube.

The mixture, thus inserted into the tube was as follows:

| | Grams |
|---|---|
| Ferro-molybdenum (60% molybdenum) | 25 |
| Boron carbide ($B_4C$) | 2.5 |
| Carbon | 1.5 |
| Copper | 1.5 |
| Monazite | 1 |
| Borax glass | 1 |

The total weight of the filled tube was about 60 grams.

For shipment purposes, and for use, the ends of the tubes are closed in any suitable manner, or the ingredients are packed into the tube so tightly that they cannot run out, or the tube may be heated to cause sintering of the filler ingredients, which sintering is facilitated by the inclusion of the borax glass as one of the filler ingredients.

A rod, similar to the foregoing in composition, may also be made by melting the various ingredients together, and then casting the melt into the form of rods.

In either case, the weld rod produces hard facing deposits or welds which are extremely hard and tough, and which have a high degree of resistance to impact and are particularly suitable for resisting abrasion when fine hard materials are likely to be encountered.

It will be understood that slight changes can be made in the composition of the weld rod without departing from the spirit of the invention or the scope of the appended claims.

The phrase "the balance being substantially all iron," as used in the claims, will be understood to include one or more of the ingredients which have been described hereinbefore as optional, up to the amounts indicated, as well as fluxes, when used, in relatively small amounts, such as are customarily incorporated in weld rods of this character. The phrase is also to be construed as including impurities which are generally found in steel or iron.

Although the invention has been described particularly with reference to weld rods, it may be noted that the alloys, as described, can also be used in the form of castings, i. e., as a cast material.

Having thus described my invention, I claim:

1. An alloy weld rod containing from about 18 to about 32% molybdenum, from about 2.8 to about 4% boron, and from about 1 to about 3% carbon, the balance being substantially all iron.

2. A weld rod, as defined in claim 1, in which said balance includes copper in amounts up to about 3.5%, chromium in amounts up to about 3% and nickel in amounts up to about 3%.

3. An alloy weld rod containing about 25% molybdenum, about 3.4% boron, about 2% copper, about 2% chromium, and about 1.75% carbon, the balance being substantially all iron.

4. An alloy containing from about 18 to about 32% molybdenum, from about 2.8 to 4% boron, and from about 1 to about 3% carbon, the balance being substantially all iron.

5. An alloy, as defined in claim 4, in which said balance includes copper in amounts up to about 3.5%, chromium in amounts up to about 3% and nickel in amounts up to about 3%.

References Cited in the file of this patent

UNITED STATES PATENTS

| | | |
|---|---|---|
| 1,757,601 | Stoody et al. | May 6, 1930 |
| 1,977,361 | Taylor | Oct. 16, 1934 |
| 2,030,342 | Wissler | Feb. 11, 1936 |
| 2,081,394 | Golyer | May 25, 1937 |
| 2,087,202 | Golyer | July 13, 1937 |
| 2,140,237 | Leitner | Dec. 13, 1938 |
| 2,219,462 | Wissler | Oct. 29, 1940 |